United States Patent
Agarwal et al.

(10) Patent No.: US 10,437,848 B2
(45) Date of Patent: Oct. 8, 2019

(54) SYSTEMS AND METHODS FOR PARSING AND INGESTING DATA IN BIG DATA ENVIRONMENTS

(71) Applicant: American Express Travel Related Services Company, Inc., New York, NY (US)

(72) Inventors: Rahul Agarwal, Noida (IN); Sachin Arya, New Delhi (IN); Sandeep Bose, Phoenix, AZ (US); Ajay Paul Singh Manesh, Punjab (IN); Harish Naik, Phoenix, AZ (US); Neha Singh, Bihar (IN)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 221 days.

(21) Appl. No.: 15/383,645

(22) Filed: Dec. 19, 2016

(65) Prior Publication Data
US 2018/0173812 A1 Jun. 21, 2018

(51) Int. Cl.
G06F 17/30 (2006.01)
G06F 16/25 (2019.01)

(52) U.S. Cl.
CPC .................. *G06F 16/254* (2019.01)

(58) Field of Classification Search
None
See application file for complete search history.

(56) References Cited

U.S. PATENT DOCUMENTS

| | | | |
|---|---|---|---|
| 2003/0023633 A1* | 1/2003 | Ross | G06F 17/24 715/234 |
| 2005/0049924 A1* | 3/2005 | DeBettencourt | H04L 43/028 705/21 |
| 2007/0005648 A1* | 1/2007 | Armanino | H04L 41/14 |
| 2007/0078872 A1* | 4/2007 | Cohen | G06F 16/338 |
| 2008/0005265 A1* | 1/2008 | Miettinen | G06F 17/248 709/217 |
| 2012/0089562 A1* | 4/2012 | Deremigio | G06F 17/30563 707/602 |
| 2013/0227519 A1* | 8/2013 | Maleport | H04L 43/12 717/106 |
| 2014/0280256 A1* | 9/2014 | Wolfram | G06F 16/90 707/755 |
| 2015/0025909 A1* | 1/2015 | Hayter, II | G06F 19/321 705/3 |

(Continued)

*Primary Examiner* — Hung D Le
(74) *Attorney, Agent, or Firm* — Snell & Wilmer, L.L.P.

(57) ABSTRACT

The system may validate a data source having a structured format and a grammar that includes tags. The system may identify a tag in the grammar. The system may parse the data source to extract attributes and/or values associated with the tags in response to successful validation. The system may also write the attributes and/or values to an output file separated by a preselected delimiter. A configuration file may identify the grammar, the preselected delimiter, and/or the data source. The data source may be in an XML format or a JSON format. The system may generate execution ready code in response to the validating the data source and the grammar. The output file may be a load ready file for ingestion into a big data storage format. The tag may include a parent tag and a sub tag corresponding to a hierarchy in the data source.

20 Claims, 6 Drawing Sheets

(56) References Cited

U.S. PATENT DOCUMENTS

2016/0020297 A1\* 1/2016 Kuang ................ H01L 29/4983
                                                    257/410
2017/0308520 A1\* 10/2017 Beahan, Jr. ........... G06F 16/288
2018/0089328 A1\*  3/2018 Bath ..................... G06F 3/0481

\* cited by examiner

SYSTEMS AND METHODS FOR PARSING AND INGESTING DATA IN BIG DATA ENVIRONMENTS

FIELD

The present disclosure relates to a file parser enabling data ingestion in big data environments.

BACKGROUND

Large data sets exist in various sizes and organizational structures. With companies adopting big data formats, data sets are as large as ever. The volume of data collected incident to increased popularity of online and electronic transactions continues to grow as a corollary. For example, billions of records (also referred to as rows) and hundreds of thousands of columns worth of data may populate a single table. The large volume of data may be collected in a raw, unstructured, and undescriptive format in some instances.

Data may be ingested into big data storage formats to convert structured files in formats such as XML or JSON into a format useable by analysts. The distributed processing systems of big data systems may be limited by incoming file formats and ingestion systems restrictive of processing parallelism. Distributed processing systems typically split input files using a record delimiter. Conversion of binary files into delimited files followed by splitting and processing may result in files being processed multiple times. Additional processing typically means additional processing time. As a result, the ingestion systems may not scale up efficiently in big data environments that ingest binary data files.

Data ingestion can also be costly in terms of time. Ingestion projects typically have different parameters that result in custom code. Ingestion projects are frequently delayed as development time is extended by writing the custom code for each incoming data format. Execution times are often long as a result of extra read/write operations as well as locking issues. Moreover, data consistency is often degraded as a result of multi-step processes and dependencies between applications and end users.

SUMMARY

A system, method, and computer readable medium (collectively, the "system") is disclosed for a big data ingestion. The system may validate a data source having a structured format and a grammar that includes tags. The system may identify a tag in the grammar. The system may parse the data source to extract attributes and/or values associated with the tags in response to successful validation. The system may also write the attributes and/or values to an output file separated by a preselected delimiter.

In various embodiments, the system may read a configuration file that identifies the grammar, the preselected delimiter, and/or the data source. The data source comprises at least one of an XML format or a JSON format. The parsing system may run on a distributed file system. The system may generate execution ready code in response to the validating the data source and the grammar. The output file may be a load ready file for ingestion into a downstream storage system such as a big data storage format. The tag may include a parent tag and a sub tag corresponding to a hierarchy in the data source.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "big data" may refer to partially or fully structured, semi-structured, or unstructured data sets including hundreds of thousands of columns and records. A big data set may be compiled, for example, from a history of purchase transactions over time, from web registrations, from social media, from records of charge (ROC), from summaries of charges (SOC), from internal data, and/or from other suitable sources. Big data sets may be compiled with or without descriptive metadata such as column types, counts, percentiles, and/or other interpretive-aid data points. The big data sets may be stored in various big-data storage formats containing millions of records (i.e., rows) and numerous variables (i.e., columns) for each record.

The present disclosure provides a system, method, and computer program product for ingesting binary big data files efficiently on distributed file systems. The system may read input files in binary format from, for example, mainframe systems. The binary files may contain numerous records, but lack delimiting characters to separate the records. The binary files may be parsed to identify the structure of the data files and accelerate ingestion. The metadata driven XML and JSON parsing tools leverage distributed file systems for speed of information by the virtue of data and streaming parallelism. Load ready files are created based on the metadata grammar provided by the end user. The framework ensures the tight integrity of the data by providing controlled balancing between the data source and the load ready file based on the configuration. The data parsing systems are flexible in that they may run in a clustered or non-clustered environment.

Figure 1:
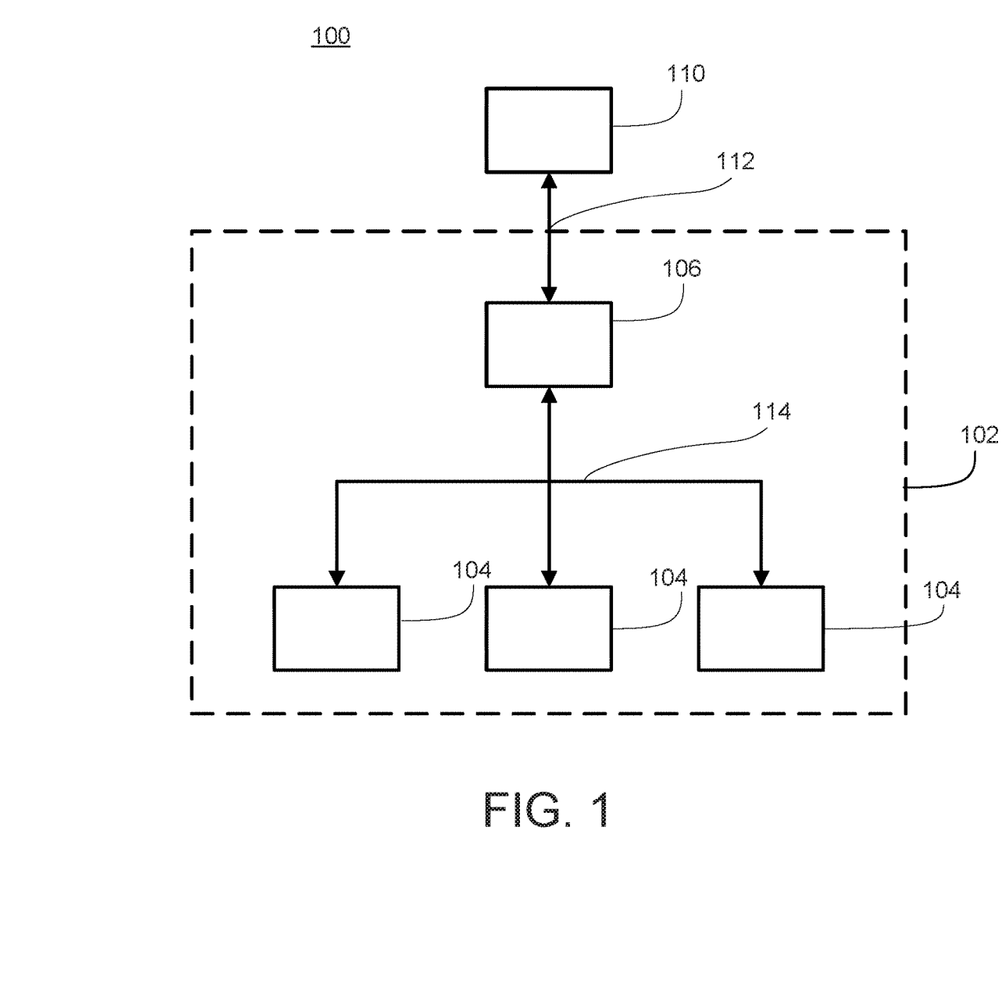
FIG. 1 illustrates an exemplary system for storing, reading, and writing big data sets, in accordance with various embodiments.

With reference to FIG. 1, a distributed file system (DFS) 100 is shown, in accordance with various embodiments. DFS 100 comprises a distributed computing cluster 102 configured for parallel processing and storage. Distributed computing cluster 102 may comprise a plurality of nodes 104 in electronic communication with each of the other nodes, as well as a control node 106. Processing tasks may be split among the nodes of distributed computing cluster 102 to improve throughput and enhance storage capacity. Distributed computing cluster may be, for example, a Hadoop® cluster configured to process and store big data sets with some of nodes 104 comprising a distributed storage system and some of nodes 104 comprising a distributed processing system. In that regard, distributed computing cluster 102 may be configured to support a Hadoop® distributed file system (HDFS) as specified by the Apache Software Foundation at http://hadoop.apache.org/docs/.

In various embodiments, nodes 104, control node 106, and client 110 may comprise any devices capable of receiving and/or processing an electronic message via network 112 and/or network 114. For example, nodes 104 may take the form of a computer or processor, or a set of computers/processors, such as a system of rack-mounted servers. However, other types of computing units or systems may be used, including laptops, notebooks, hand held computers, personal digital assistants, cellular phones, smart phones (e.g., iPhone®, BlackBerry®, Android®, etc.) tablets, wearables (e.g., smart watches and smart glasses), or any other device capable of receiving data over the network.

In various embodiments, client 110 may submit requests to control node 106. Control node 106 may distribute the tasks among nodes 104 for processing to complete the job intelligently. Control node 106 may limit network traffic and enhance the speed at which incoming data is processed. In that regard, client 110 may be a separate machine from distributed computing cluster 102 in electronic communication with distributed computing cluster 102 via network 112. A network may be any suitable electronic link capable of carrying communication between two or more computing devices. For example, network 112 may be local area network using TCP/IP communication or wide area network using communication over the Internet. Nodes 104 and control node 106 may similarly be in communication with one another over network 114. Network 114 may be an internal network isolated from the Internet and client 110, or, network 114 may comprise an external connection to enable direct electronic communication with client 110 and the internet.

A network may be unsecure, so communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptography systems.

In various embodiments. DFS 100 may process hundreds of thousands of records from a single data source. DFS 100 may also ingest data from hundreds of data sources. Nodes 104 may process the data in parallel to expedite the processing. Furthermore, the transformation and intake of data as disclosed herein may be carried out in memory on nodes 104. For example, in response to receiving a source data file of 100,000 records, a system with 100 nodes 104 may distribute the task of processing 1,000 records to each node 104. Each node 104 may then process any portion or all of the stream of 1,000 records, while maintaining the resultant data in memory until the batch is complete for batch processing jobs. The results may be read, augmented, logged, and written to disk for subsequent retrieval. The results may be written to disks using various big data storage formats.

Figure 2:
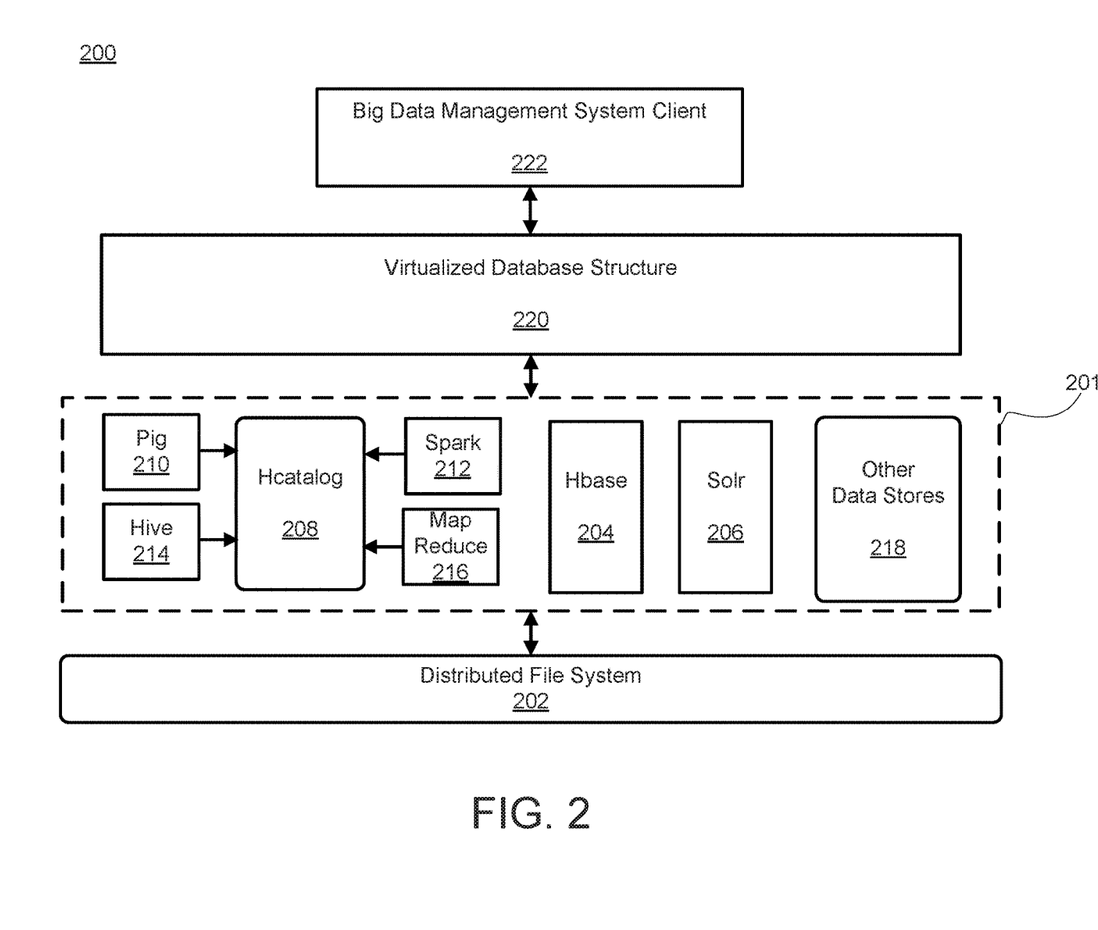
FIG. 2 illustrates an exemplary big data management system supporting a unified, virtualized interface for multiple data storage types, in accordance with various embodiments.

With reference to FIG. 2, an exemplary architecture of a big data management system (BDMS) 200 is shown, in accordance with various embodiments. BDMS 200 may by similar to or identical to DFS 100 of FIG. 1, for example. DFS 202 may serve as the physical storage medium for the various data storage formats 201 of DFS 202. A non-relational database 204 may be maintained on DFS 202. For example, non-relational database 204 may comprise an HBase™ storage format that provides random, real time read and/or write access to data, as described and made available by the Apache Software Foundation at http://hbase.apache.org/.

In various embodiments, a search platform 206 may be maintained on DFS 202. Search platform 206 may provide distributed indexing and load balancing to support fast and reliable search results. For example, search platform 206 may comprise a Solr® search platform as described and made available by the Apache Software Foundation at http://lucene.apache.org/solr/.

In various embodiments, a data warehouse 214 such as Hive® may be maintained on DFS 202. The data warehouse 214 may support data summarization, query, and analysis of warehoused data. For example, data warehouse 214 may be a Hive® data warehouse built on Hadoop® infrastructure. A data analysis framework 210 may also be built on DFS 202 to provide data analysis tools on the distributed system. Data analysis framework 210 may include an analysis runtime environment and an interface syntax such similar to those offered in the Pig platform as described and made available by the Apache Software Foundation at https://pig.apache.org/.

In various embodiments, a cluster computing engine 212 for high-speed, large-scale data processing may also be built on DFS 202. For example, cluster computing engine 212 may comprise an Apache Spark™ computing framework running on DFS 202. DFS 202 may further support a MapReduce layer 216 for processing big data sets in a parallel, distributed manner to produce records for data storage formats 201. For example, MapReduce layer 216 may be a Hadoop® MapReduce framework distributed with the Hadoop® HDFS as specified by the Apache Software Foundation at http://hadoop.apache.org/docs/. The cluster computing engine 212 and MapReduce layer 216 may ingest data for processing, transformation, and storage in data storage formats 201 using the distributed processing and storage capabilities of DFS 202.

In various embodiments, DFS 202 may also support a table and storage management layer 208 such as, for example, an HCatalog installation. Table and storage management layer 208 may provide an interface for reading and writing data for multiple related storage formats. Continuing the above example, an HCatalog installation may provide an interface for one or more of the interrelated technologies described herein such as, for example, Hive®, Pig, Spark®, and Hadoop® MapReduce.

In various embodiments, DFS 202 may also include various other data storage formats 218. Other data storage formats 218 may have various interface languages with varying syntax to read and/or write data In fact, each of the herein disclosed storage formats may vary in query syntax and interface techniques. Virtualized database structure 220 may provide a uniform, integrated user experience by offering users a single interface point for the various different data storage formats 201 maintained on DFS 202. Virtualized database structure 220 may be a software and/or hardware layer that makes the underlying data storage formats 201 transparent to client 222 by providing variables on request. Client 222 may request and access data by requesting variables from virtualized database structure 220. Virtualized database structure 220 may then access the variables using the various interfaces of the various data storage formats 201 and return the variables to client 222.

In various embodiments, the data stored using various disclosed data storage formats 201 may be stored across data storage formats 201 and accessed at a single point through virtualized database structure 220. The variables accessible through virtualized database structure 220 may be similar to a column in a table of a traditional RDBMS. That is, the variables identify data fields available in the various data storage formats 201.

In various embodiments, variables may be stored in a single one of the data storage formats 201 or replicated across numerous data storage formats 201 to support different access characteristics. Virtualized database structure 220 may comprise a catalog of the various variables available in the various data storage formats 201. The cataloged variables enable BDMS 200 to identify and locate variables stored across different data storage formats 201 on DFS 202. Variables may be stored in at least one storage format on DFS 202 and may be replicated to multiple storage formats on DFS 202. The catalog of virtualized database structure 220 may track the location of a variable available in multiple storage formats.

The variables may be cataloged as they are ingested and stored using data storage formats 201. The catalog may track the location of variables by identifying the storage format, the table, and/or the variable name for each variable available through virtualized database structure 220. The catalog may also include metadata describing what the variables are and where the variables came from such as data type, original source variables, timestamp, access restrictions, sensitivity of the data, and/or other descriptive metadata. For example, internal data and/or personally identifying information (PII) may be flagged as sensitive data subject to access restrictions by metadata corresponding to the variable containing the internal data and/or PII. Metadata may be copied from the storage formats 201 or generated separately for virtualized database structure 220.

In various embodiments, virtualized database structure 220 may provide a single, unified, and virtualized data storage format that catalogues accessible variables and provides a single access point for records stored on data storage formats 201. Client 222 (which may operate using similar hardware and software to client 110 of FIG. 1) may access data stored in various data storage formats 201 via the virtualized database structure 220. In that regard, virtualized database structure 220 may be a single access point for data stored across the various data storage formats 201 on DFS 202.

In various embodiments, virtualized database structure 220 may store and maintain the catalog of variables including locations and descriptive metadata, but virtualized database structure 220 may not store the actual data contained in each variable. The data that fills the variables may be stored on DFS 202 using data storage formats 201. Virtualized database structure 220 may enable read and write access to the data stored in data storage formats 201 without a client system having knowledge of the underlying data storage formats 201.

Figure 3:
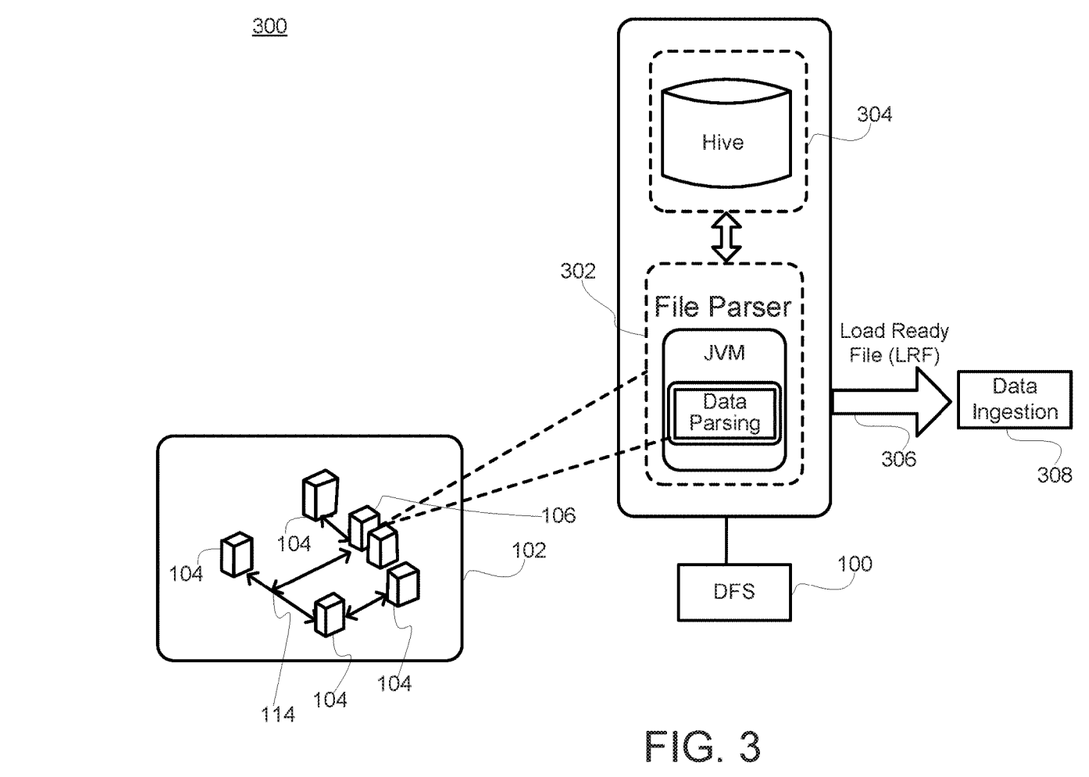
FIG. 3 illustrates a system architecture for a data parsing system for big data ingestion, in accordance with various embodiments.

Referring now to FIG. 3, system 300 is configured for ingesting data into a big data environment, in accordance with various embodiments. System 300 may comprise a file parser 302 running on distributed computing cluster 102. File parser 302 may run on a single computing device such as a control node 106, a node 104, and/or a client 110. File parser 302 may also run on a plurality of nodes including multiple nodes 104. File parser 302 may be a script or application running on distributed computing cluster 102, for example, on a virtual machine such as a java virtual machine (JVM). File parser 302 may read a JSON, XML, or other structured file to extract information to accelerate parsing. File parser 302 can extract both a tag value and the attribute for each JSON or XML element. File parser 302 generates one or more load ready file 306 for data ingestion 308. File parser 302 may be in communication with a hive tables 304, for example, to write the data stored in hive tables 304 into load ready files.

In various embodiments, file parser 302 may have error handling capable of rectifying zero or more occurrences of a JSON or XML tag. In that regard, file parser 302 may support different iterations of various tags. File parser 302 may also read and extract data from non-recursive tags (i.e., single level) as well as recursive tags (i.e., multi-level). File parser 302 may also differentiate between identical tag names under a different parent tag. Can normalize & de-normalize the array of elements. File parser 302 may also be configured to extract information from n-level of parent and/or child tags taking a top down or bottom up approach. File parser 302 may handle all possible datatypes for JSON including arrays, for example.

The file parser 302 may support 0 to N occurrences of a tag, where N is a natural number. File parser 302 may handle a tag that is not present at the time when initial configuration is written for an XML file, for example. File parser 302 may thus be configured with the future in mind as the configuration file may include tags will be introduced in future phases. File parser 302 may include such tags at the time of requirement gathering and configuration, and have the columns populated in a load ready file once the tag is available. File parser 302 may also handle identical name tags with XML xpath functionality. Xpath is a language for retrieving xml nodes from an XML document. File parser 302 may thus provide variables of all data types populated at a load ready file. File parser 302 may also create normalized and/or de-normalized load ready files. The term normalized as used with load ready files means a collection of various different load ready files and target tables populated with the foreign keys. The term de-normalized as used with load ready files means the output resulting from flattening an input in just one load ready file.

In various embodiments, load ready file 306 may be generated as a delimited file. The user may identify a delimiter in a configuration file for file parser 302. In that regard, load ready files 306 generated using file parser 302 may be integrated with any data management or data ingestion tool/framework.

Figure 4:
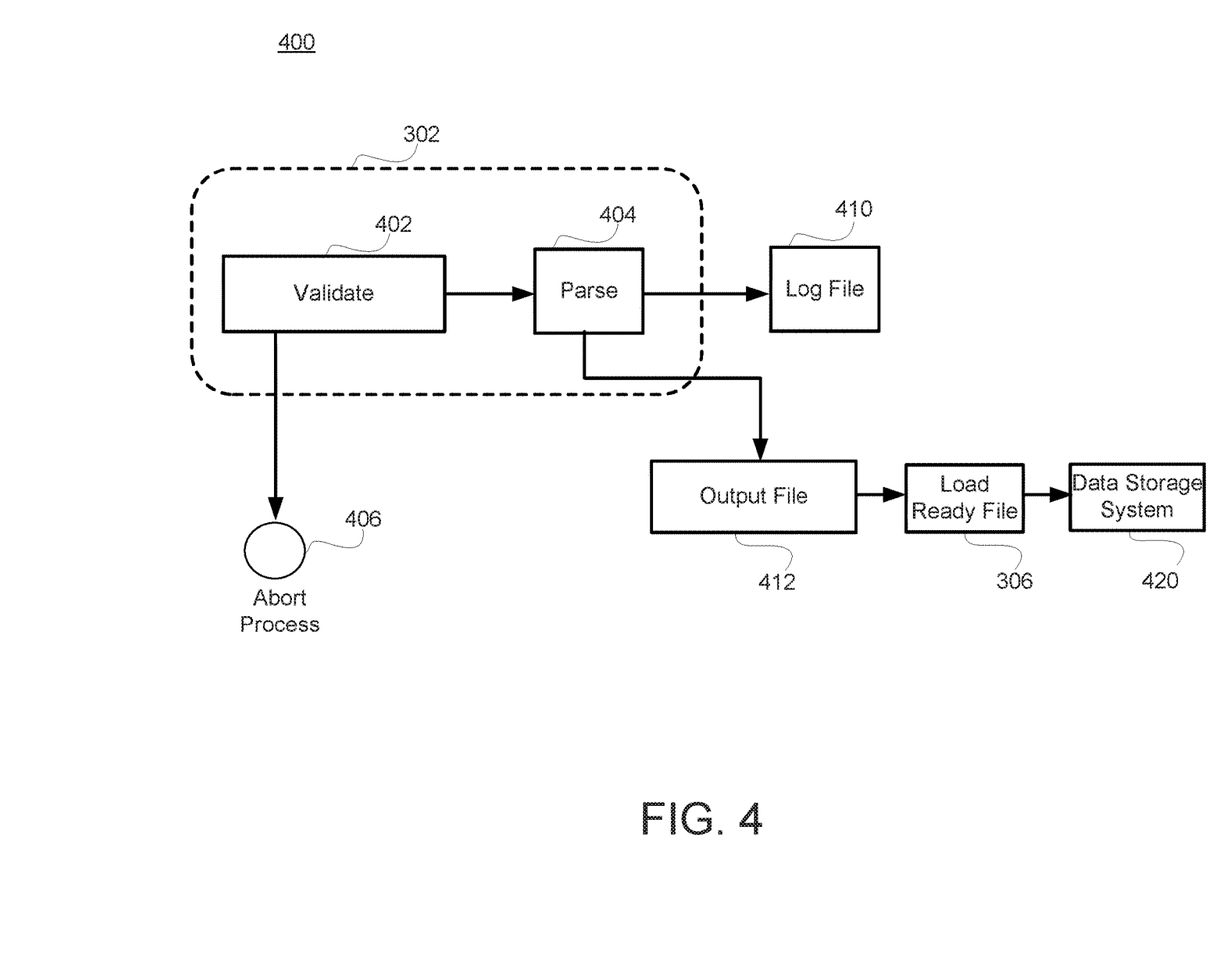
FIG. 4 illustrates an end-to-end architecture for a data parsing system for big data ingestion, in accordance with various embodiments.

With reference to FIG. 4, the end-to-end architecture of parsing system 400 is shown, in accordance with various embodiments. Parsing system 400 may comprise file parser 302 operating as described herein. File parser 302 may validate 402 XML, JSON, or other structured files to determine whether the file is syntactically valid, as described in greater detail herein. For example, file parser 302 may read a JSON file and detect whether each tag is opened and closed according to JSON syntax. Validation may also include determining whether tags expected in input data are present and/or duplicative. File parser 302 may abort 406 the process in response to validation detecting improper syntax in a structured file. File parser 302 may parse 404 a file in response to successfully validating the file. To parse the file, file parser 302 may read XML or JSON tags to identify that attributes and/or values in the tags.

In various embodiments, file parser 302 may be configurable using a configuration file, a dashboard, a UI, a command line, or other suitable configuration techniques. A configuration file may identify various values for file parser 302. For example, the configuration file may identify an input data source, output file location, output file delimiter, distributed or single machine processing, the number of calls, tag identifiers, output headers, log file location, etc. File delimiters may include pipes, commas, semicolons, tabs, slashes, or any other ASCII character to support various downstream data storage environments such as, for example, big data storage formats, relational databases, non-relational databases. Based on the metadata identified in the configuration file and/or input data source, file parser 302 may create the execution ready code in the backend dynamically to parse any kind of XML and/or JSON files.

Execution ready code may be compiled once and deployed at a node 104 by distributed computing cluster 102 to be executed where the data resides. File parser 302 may read source files, locate tags or attributes in the source file based on the configuration provided, and create records for writing to output file. Dynamically generated code may be generated using a dynamic programming language such as JavaScript, Python, Ruby, or Perl, for example. The configuration file may be written using a text editor or generated using a graphical UI to facilitate ease of use.

File parser 302 may write an output file 412. Output file 412 may be character delimited as described herein. Output file 412 may be written to include data identified by tags in a structured file such as an XML or JSON input file. Output file 412 may be written to include tag attributes and tag attributes. File parser 302 may also generate log file 410 to write errors and/or successful operations encountered in validation 402 and/or parsing 404. Log file 410 may be read to determine whether output file 412 should be loaded into a data warehouse or data storage system. For example, log file 410 may be read by a process running on data storage system 420 to identify fatal errors and abort data ingestion in response to the fatal errors.

Figure 5:
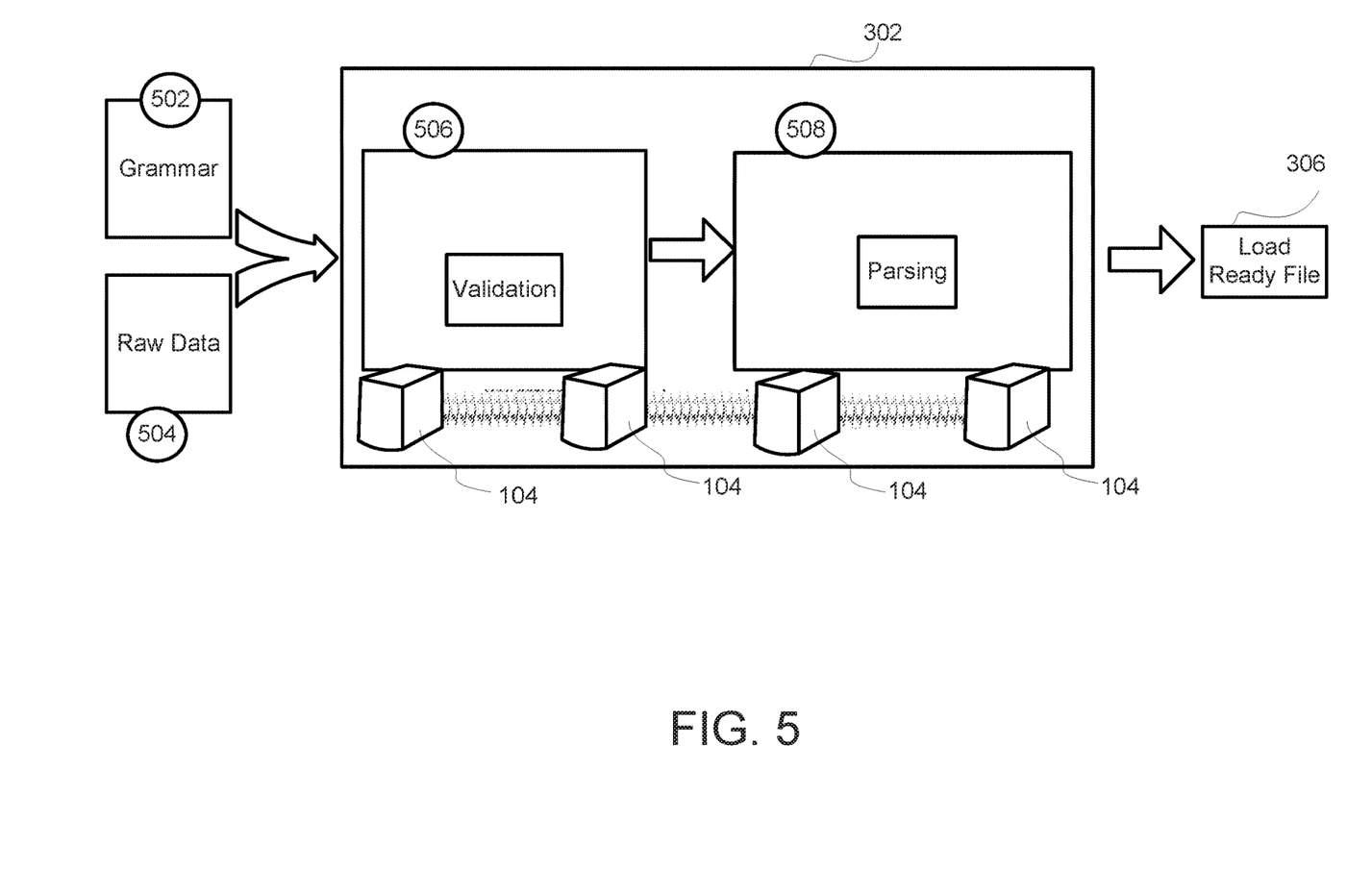
FIG. 5 illustrates a flow diagram for a data parsing system for big data ingestion, in accordance with various embodiments.

With reference to FIG. 5, a flow chart illustrating the functionality of file parser 302 is shown, in accordance with various embodiments. File parser 302 may read grammar 502 and raw data 504 as input. Grammar 502 may be provided in the configuration described herein and generated by the end user. Grammar 502 may identify a collection of tag identifiers that match tags in a raw data 504 in JSON, XML, or another structured data format. The tags may be ordered in Grammar 502 to correspond with the desired order in load ready file 306. An example tag organization in grammar 502 may appear as follows: field1, field2, field3/subfield1, field3/subfield2/subfield 1, field4/subfield 1, field 5. In the preceding example of a grammar the terms identified as fields may be top level tags, subfields may signify lower level tags that are nested beneath a top level tag at second level, third level, etc. Grammar 502 may serve to select data from a structured file for inclusion in load ready, file 306.

In various embodiments, raw data 504 may be a structured data feed, for example using the XML or JSON formats. The tags identified in grammar 502 may correspond to tags that denote data fields present in raw data 504. Raw data 504 and grammar 502 may be input into file parser 302 funning on nodes 104 of distributed computing cluster 102 for validation 506. In response to successful validation, file parser 302 may move from validation 506 to parsing 508, as described herein.

In various embodiments, parsing 508 may include reading grammar 502 to identify tags. The tags identified in grammar 502 are then matched to tags in raw data 504 to identify the data desired in load ready file 306. File parser 302 may locate each occurrence in raw data 504 of the tags identified by grammar 502. File parser 302 may also write the attribute and/or tag value to an output file or output stream with the values delimited by a selectable ASCII character. In that regard, each record (row) in the flat file output by file parser 302 may include a delimiter between each field in the record. The fields contain the data extracted from raw data 504 at the corresponding tag identified in grammar 502. In response to a tag identified in grammar 502 missing from raw data 504, file parser 302 may write a null value or leave the field empty and print consecutive delimiters to the output file or stream. File parser 302 may write an entry in log file 410 commemorating the missing tag.

In various embodiments, file parser 302 may deterministically select a value to write to load ready file 306 in response to detecting more than one of the same tag in a record. For example, file parser 302 may write the first value detected into load ready file and write a log entry commemorating the collision between identical tags in the same record. The output file may be a load ready file 306 in a format suitable for loading into a downstream data storage system such as DFS 100 of FIG. 1.

Figure 6:
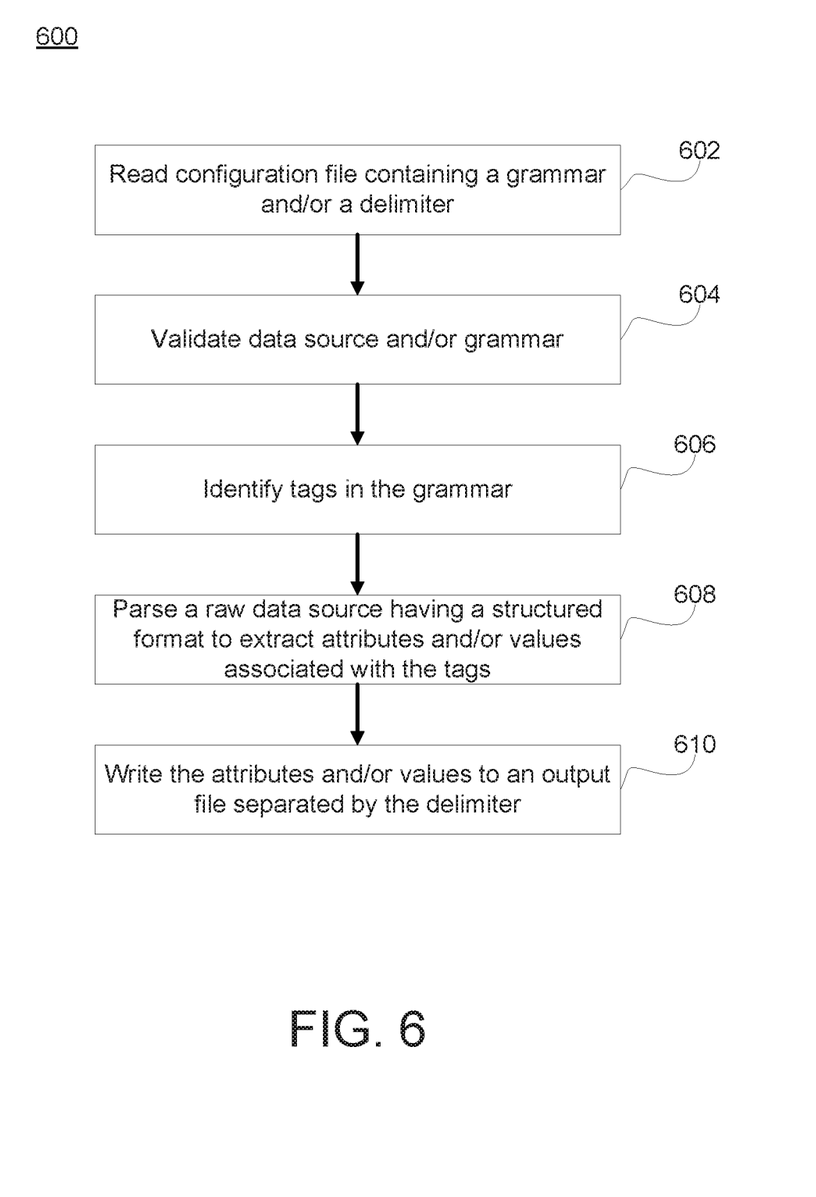
FIG. 6 illustrates a process for parsing data for ingestion into a big data environment, in accordance with various embodiments.

Referring now to FIG. 6, a process 600 for execution on a computing device such as distributed computing cluster 102 is shown for parsing data in a structured format, in accordance with various embodiments. The computing device may read a configuration file containing a grammar and/or a delimiter (Step 602). The grammar may be written to a configuration file (as described herein) available at a predetermined or identified location. A user may identify the configuration file location when launching file parser 302. For example, a storage location and configuration file name may be provided at the command line when launching file parser from a shell or script.

In various embodiments, file parser 302 running on the computing device may validate a data source and/or the configuration file (Step 604). Validation may include that the configuration file contains the expected parameters. For example, the configuration file may contain parameters indicating one or more data sources, the processing approach (distributed or single device), the number of output files to generate, a grammar for each output file to be generated, etc. File parser 302 may validate the data file by identifying that the expected parameters and/or optional parameters have correct values. Incorrect values may be written to log file 410 with an error indicating the incorrect parameter, the detected value, and/or an indication whether the error was recoverable or resulted in aborting the parsing process.

In various embodiments, the computing device may identify tags in the grammar (Step 606). The tags may be identified in a predetermined manner. For example, tags may be written in a list with teach tag separated by a comma. In another example, sub tags may be identified by prepending the parent tag names separated by a slash (PaterntTag/SubTag). File parser 302 sunning on the computing device may store the tags for identification in a list, an array, a string, a collection of variables, or any other suitable data structure.

In various embodiments, the computing device may parse a raw data source having a structured format to extract attributes and/or values associated with the tags (Step 608). The raw data source may be identified in the configuration file. The raw data source may be an XML or JSON data source. File parser 302 may extract attributes and or values from the data source by matching the tags from grammar 502 to the tags present in the data source.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein. "authenticate" or similar terms may include an exact authentication, a partial authentication, authenticating a subset of data, a correspondence, satisfying certain criteria, an association, an algorithmic relationship and/or the like.

In various embodiments, the computing device may write the attributes and/or values to an output file separated by the delimiter (Step 610). The output file may be a load ready file compatible with one or more downstream data storage formats. For example, the output file may be a load ready file for ingestion into distributed file system 100.

Data parsing techniques of the present disclosure tend to reduce in the CPU processing time spend ingesting data and thereby reduce the cost of maintaining big data storage systems. As a corollary, systems and methods of the present disclosure also tend to reduce in feed development and maintenance time. The systems and methods described herein are also platform agnostic and can run in cluster and/or non-cluster environments.

The parsing system works on the metadata driven principles. The scalability and flexibility enable the parsing systems to handle both simple or complex parsing jobs, using the same metadata to do extraction in either case. The parsing system may also function in conjunction with a scheduler to enable timed and/or event-based triggering. The system reduces the total number of processes, total number of break points, and/or total number of I/O operations. Data may be available through the common process and common load ready file which allows catering the needs of different downstream end uses concurrently.

Systems, methods and computer program products are provided. In the detailed description herein, references to "various embodiments", "one embodiment", "an embodiment". "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert.

More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file.

The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file: transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS® NT®, WINDOWS® 95/98/2000®, WINDOWS® XP®, WINDOWS® Vista®, WINDOWS® 7, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet account), a communications port, a Personal Computer Memory Account International Association (PCMCIA) slot and account, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any databases discussed herein may include relational, nonrelational, hierarchical, graphical, or object-oriented structure and/or any other database configurations including various big data products available from the Apache Software Foundation as described herein. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® APPLE® ts, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion. COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Although the disclosure includes a method, it is contemplated that it may be embodied as computer program instructions on a tangible computer-readable carrier, such as a magnetic or optical memory or a magnetic or optical disk.

All structural, chemical, and functional equivalents to the elements of the herein-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, and C" or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   validating, by a parsing system, a data file based on parameters having correct values;
   writing, by the parsing system, incorrect values to a log file with an error indicating at least one of an incorrect parameter, a detected value, or whether the error was recoverable or resulted in aborting a parsing process;
   validating, by the parsing system, a data source and grammar,
   wherein the data source comprises a structured format, and
   wherein the grammar includes tags in a predetermined format;
   identifying, by the parsing system, the tags in the grammar;
   identifying, by the parsing system, the data source in a configuration file;
   matching, by the parsing system, the tags from the grammar with the tags from the data source;
   parsing, by the parsing system and based on the matching, the data source to extract at least one of an attribute or a value associated with each of the tags in response to the validating of the data source being successful; and
   writing, by the parsing system, at least one of the attribute or the value to an output file separated by a delimiter, wherein the output file is a load ready file for ingestion into a distributed file system.

2. The method of claim 1, wherein each record in the output file includes the delimiter between each field in the record.

3. The method of claim 1, wherein the data source comprises at least one of an XML format or a JSON format.

4. The method of claim 1, further comprising:
launching, by the parsing system, a file parser from at least one of a shell or script;
obtaining, by the parsing system, a storage location and a configuration file name from a command line;
reading, by the parsing system and based on the obtaining, the configuration file containing the data source, the grammar and the delimiter, wherein the grammar is written to the configuration file at a location;
determining, by the parsing system, that the configuration file contains parameters indicating at least one of one or more data sources, a processing approach, a number of output files to generate, and the grammar for each of the output files to be generated; and
validating, by the parsing system and based on the determining, the configuration file.

5. The method of claim 1, further comprising generating, by the parsing system, execution ready code in response to the validating the data source and the grammar.

6. The method of claim 1, further comprising loading the output file into a big data storage format.

7. The method of claim 1, wherein each of the tags include a parent tag and a sub tag corresponding to a hierarchy in the data source.

8. A computer-based system, comprising:
a processor; and
a tangible, non-transitory memory configured to communicate with the processor, the tangible, non-transitory memory having instructions stored thereon that, in response to execution by the processor, cause a parsing system to perform operations comprising:
validating, by the parsing system, a data file based on parameters having correct values;
writing, by the parsing system, incorrect values to a log file with an error indicating at least one of an incorrect parameter, a detected value, or whether the error was recoverable or resulted in aborting a parsing process;
validating, by the parsing system, a data source and grammar,
wherein the data source comprises a structured format, and
wherein the grammar includes tags in a predetermined format;
identifying, by the parsing system, the tags in the grammar;
identifying, by the parsing system, the data source in a configuration file;
matching, by the parsing system, the tags from the grammar with the tags from the data source;
parsing, by the parsing system and based on the matching, the data source to extract at least one of an attribute or a value associated with each of the tags in response to the validating of the data source being successful; and
writing, by the parsing system, at least one of the attribute or the value to an output file separated by a delimiter, wherein the output file is a load ready file for ingestion into a distributed file system.

9. The computer-based system of claim 8, wherein each record in the output file includes the delimiter between each field in the record.

10. The computer-based system of claim 8, wherein the data source comprises at least one of an XML format or a JSON format.

11. The computer-based system of claim 8, further comprising:
launching, by the parsing system, a file parser from at least one of a shell or script;
obtaining, by the parsing system, a storage location and a configuration file name from a command line;
reading, by the parsing system and based on the obtaining, the configuration file containing the data source, the grammar and the delimiter, wherein the grammar is written to the configuration file at a location;
determining, by the parsing system, that the configuration file contains parameters indicating at least one of one or more data sources, a processing approach, a number of output files to generate, and the grammar for each of the output files to be generated; and
validating, by the parsing system and based on the determining, the configuration file.

12. The computer-based system of claim 8, further comprising generating, by the parsing system, execution ready code in response to the validating the data source and the grammar.

13. The computer-based system of claim 8, further comprising loading the output file into a big data storage format.

14. The computer-based system of claim 8, wherein each of the tags include a parent tag and a sub tag corresponding to a hierarchy in the data source.

15. An article of manufacture including a non-transitory, tangible computer readable storage medium having instructions stored thereon that, in response to execution by a parsing system, cause the parsing system to perform operations comprising:
validating, by the parsing system, a data file based on parameters having correct values;
writing, by the parsing system, incorrect values to a log file with an error indicating at least one of an incorrect parameter, a detected value, or whether the error was recoverable or resulted in aborting a parsing process;
validating, by the parsing system, a data source and grammar,
wherein the data source comprises a structured format, and
wherein the grammar includes tags in a predetermined format;
identifying, by the parsing system, the tags in the grammar;
identifying, by the parsing system, the data source in a configuration file;
matching, by the parsing system, the tags from the grammar with the tags from the data source;
parsing, by the parsing system and based on the matching, the data source to extract at least one of an attribute or a value associated with each of the tags in response to the validating of the data source being successful; and
writing, by the parsing system, at least one of the attribute or the value to an output file separated by a delimiter, wherein the output file is a load ready file for ingestion into a distributed file system.

16. The article of claim 15, wherein each record in the output file includes the delimiter between each field in the record.

17. The article of claim 15, wherein the data source comprises at least one of an XML format or a JSON format.

18. The article of claim 15, further comprising:

launching, by the parsing system, a file parser from at least one of a shell or script;

obtaining, by the parsing system, a storage location and a configuration file name from a command line;

reading, by the parsing system and based on the obtaining, the configuration file containing the data source, the grammar and the delimiter, wherein the grammar is written to the configuration file at a location;

determining, by the parsing system, that the configuration file contains parameters indicating at least one of one or more data sources, a processing approach, a number of output files to generate, and the grammar for each of the output files to be generated; and validating, by the parsing system and based on the determining, the configuration file.

19. The article of claim 15, further comprising generating, by the parsing system, execution ready code in response to the validating the data source and the grammar.

20. The article of claim 15, wherein each of the tags include a parent tag and a sub tag corresponding to a hierarchy in the data source.

\* \* \* \* \*